United States Patent [19]
Gran

[11] 3,892,988
[45] July 1, 1975

[54] HAND-HELD MULTI-PURPOSE ELECTRIC MEAT TENDERIZER

[76] Inventor: William M. Gran, 3030 N. 7th St., Phoenix, Ariz. 85014

[22] Filed: Feb. 27, 1974

[21] Appl. No.: 446,126

[52] U.S. Cl. .......... 310/50; 7/13.1; 17/29; 173/101; 310/29; 310/DIG. 1
[51] Int. Cl.².... H02K 7/14; B25F 1/00; A22C 9/00
[58] Field of Search ........... 310/50, DIG. 1, 29, 30, 310/36, 37, 80–84; 17/29, 30; 7/1 A, 13.1, 14.1; 30/122, 358, 362, 44; 173/101, 117, 118; 128/57

[56] References Cited
UNITED STATES PATENTS

| 50,732 | 10/1865 | Pyle | 7/13.1 |
|---|---|---|---|
| 1,707,366 | 4/1929 | Pasque | 310/50 UX |
| 1,895,116 | 1/1933 | Wilsey | 128/57 |
| 1,958,936 | 5/1934 | Bajette et al. | 128/57 X |
| 2,400,853 | 5/1946 | Stilley | 173/101 X |
| 2,461,571 | 2/1949 | Robinson | 173/117 X |
| 2,646,100 | 7/1953 | Gibson | 173/117 X |
| 3,425,498 | 2/1969 | Bick | 173/101 X |

Primary Examiner—J. D. Miller
Assistant Examiner—Robert J. Hickey
Attorney, Agent, or Firm—Warren F. B. Lindsley

[57] ABSTRACT

A small hand-held electric appliance for, inter alia, tenderizing meat comprising in one embodiment a replaceable serrated roller electrically vibrated as it is rolled manually over the meat and in other embodiments improved arrangements for driving a pair of impactors in a reciprocating action.

5 Claims, 8 Drawing Figures

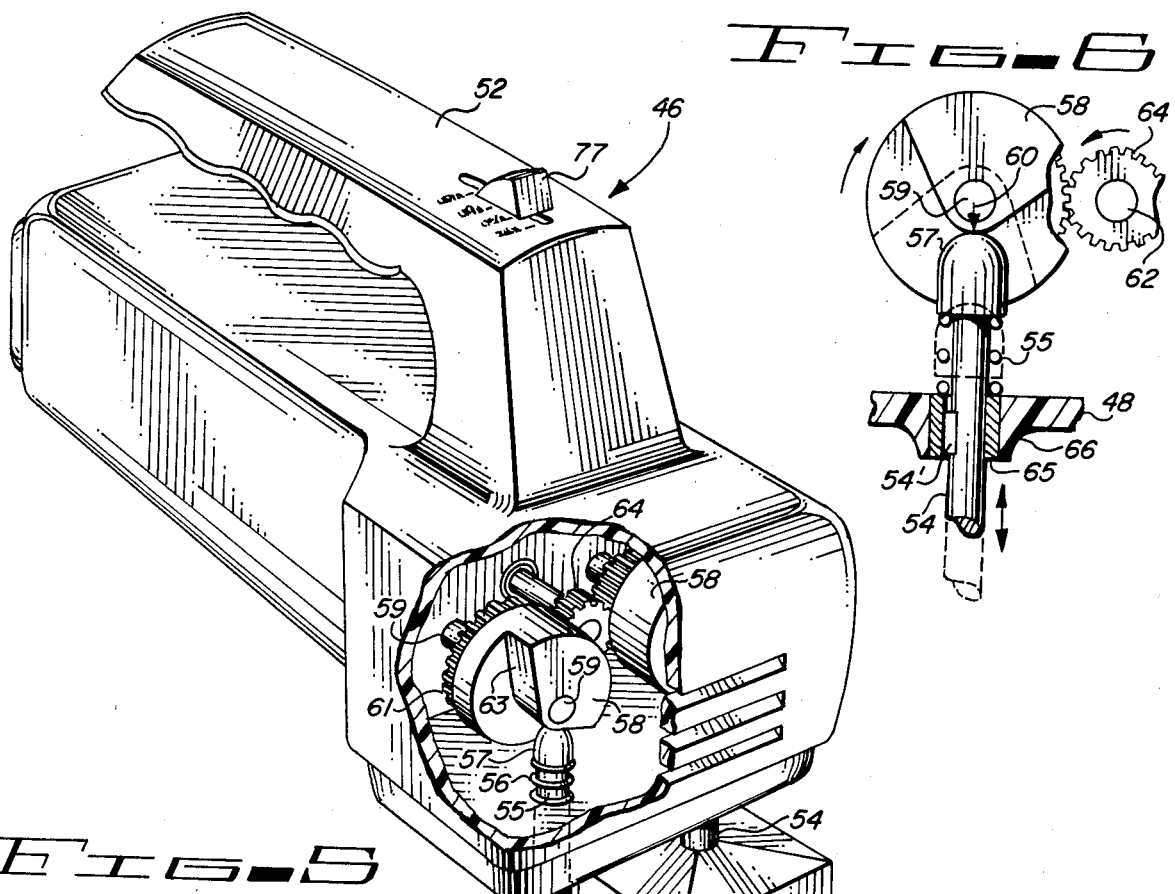

HAND-HELD MULTI-PURPOSE ELECTRIC MEAT TENDERIZER

BACKGROUND OF THE INVENTION

It has long been recognized that certain cuts of meat are rendered more palatable if they are tenderized before frying, broiling or cooking in some other manner. In the past, the meat has been repeatedly struck with a hammer-like implement having a serrated face.

A more recent innovation is the application of certain chemicals or enzymes such as pepsin to the raw meat prior to cooking it. This practice has been questioned, however, by some who are concerned that the chemicals employed for tenderizing may be harmful to the health of the consumer. Whether these fears are well-founded or not, there is a growing reluctance on the part of the consumer to avoid as much as possible the use of chemical additives in his food where the complete long-term safety of such additives has not been fully demonstrated.

Other meats not requiring tenderizing to render them palatable nevertheless are sometimes conditioned by a tenderizing instrument to aid in rolling them into fillets or other similar exotic forms.

The chef or housewife who tenderizes or conditions meat often would appreciate a small appliance for reducing the time and physical effort required for this operation, especially if it provides a more thorough and effective tenderizing action. The demand for such a device is increasing as the better cuts of meat not requiring tenderizing become more expensive and as chemical tenderizers become less popular.

SUMMARY OF THE INVENTION

In accordance with the invention claimed, an improved and more effective hand-held electric meat tenderizer is provided which substantially reduces the time and effort required for tenderizing meat before cooking.

It is therefore one object of this invention to provide an improved hand-held electric meat tenderizer, not a mutilator using spikes.

Another object of this invention is to provide an improved hand-held electric meat tenderizing appliance employing a serrated roller which is vibrated as it is manually rolled over the meat.

A further object of this invention is to provide an improved hand-held electric meat tenderizer which utilizes a simple and effective means for producing a reciprocating action which drives impacting heads against the meat.

A still further object of this invention is to provide an improved hand-held electric meat tenderizing appliance wherein the reciprocating action achieved through the use of a shaft which, under the restraint of a sleeve bearing and a spring, is driven by a rotating cam.

A still further object of this invention is to provide an improved tenderizing appliance wherein the reciprocating action is achieved through the use of a shaft coupled to a pivot which is driven in a circular path.

A still further object of this invention is to provide a multi-purpose electric meat tenderizing appliance wherein a meat tenderizing roller may be replaced by other rollers thereby rendering the appliance suitable for other functions such as cookie dough cutting, dicing of vegetables, strip cutting of dough for noodles, french fries and the like.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing in which:

FIG. 5 is a perspective view of a variation of the embodiment shown in FIGS. 1–4 of the hand-held electric meat tenderizer employing gear and cam driven reciprocating hammer heads with a cutaway portion revealing details of the internal construction.

FIG. 6 illustrates details of the mechanical drive mechanism of the embodiment shown in FIG. 5.

FIG. 7 is a partial cross-sectional view of a variation of the meat tenderizer shown in FIGS. 5 and 6 employing a different mechanical drive mechanism.

FIG. 8 is a further view of the drive mechanism shown in FIG. 7 taken in the direction indicated by arrow 8 of FIG. 7.

DESCRIPTION OF THE PREFERRED EMBODIMENT

Figure 1:
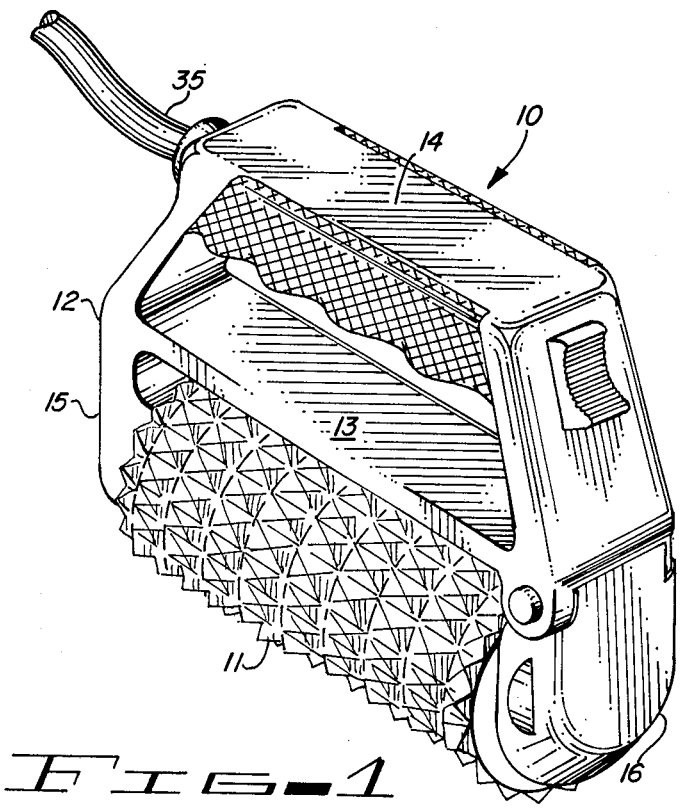
FIG. 1 is a perspective view of an electric hand-held meat tenderizer embodying the invention.
Figure 2:
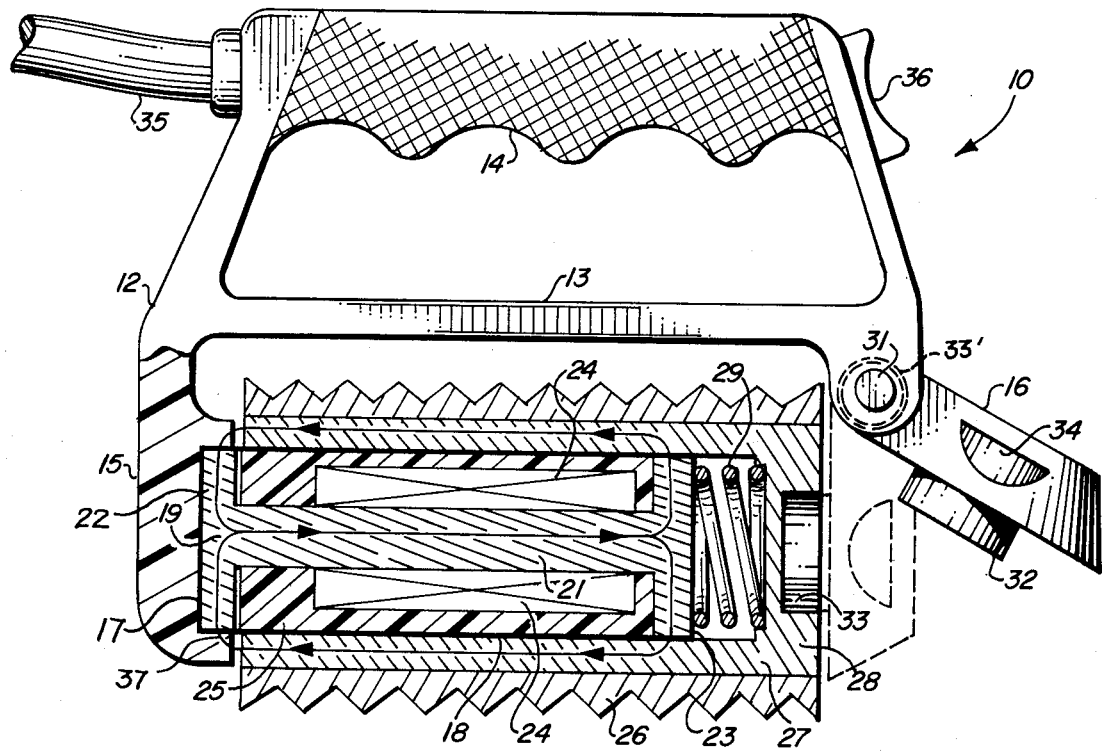
FIG. 2 is a cross-sectional view of the meat tenderizer of FIG. 1 showing internal details involving the mechanical mounting and the electrical energization of its vibrating meat tenderizing roller.

Referring more particularly to the drawing by characters of reference, FIGS. 1 and 2 illustrate a hand-held electric meat tenderizer 10 comprising a serrated roller 11 mounted on a frame 12 which incorporates within its structure a finger guard 13, a hand-grip 14, a fixed rear roller mount 15 and a pivoting forward roller mount 16.

Fixedly attached to and projecting forwardly from rear roller mount 15 is a stator assembly 17 which has a simple cylindrical outer surface 18 as outlined by the heavy dark line. Stator assembly 17 comprises a soft magnetic core 19 which is in the form of a spool having a long cylindrical center member 21 terminated at the ends by short cylindrical caps 22 and 23 having a diameter two to three times that of center member 21. A coil 24 comprising many turns of insulated magnet wire is wound concentrically about center member 21 and an encapsulating material 25 mechanically secures coil 24 in place over member 21 providing electrical insulation and completing the outer cylindrical surface of stator 17 within the cylindrical contours defined by cylindrical outer surface 18.

Roller 11 has a serrated outer shell 26 and a concentric cylindrical inner shell 27 which is fabricated from a soft magnetic material. The concentric outer and inner shells 26 and 27 are closed at the forward end by a circular cap 28. The concentric shells 26 and 27 and cap 28 constitute a cup-shaped armature having an inner cylindrical surface with a diameter slightly greater than the diameter of stator 17 so that when roller 11 is slipped over stator 17, open end first, as shown in FIG. 2, roller 11 fits relatively snugly over stator 17 but is yet free to rotate and to move axially with respect to stator 17. A coil spring 29 secured inside roller 11 to end cap 23 resists the rearward motion of roller 11 relative to stator 17.

Forward roller mount 16 is pivotally mounted to frame 12 by means of a pin 31 so that roller mount 16 may be pivoted forwardly and upwardly to provide clearance for the installation of roller 11 over stator 17. A cylindrical projection 32 is axially aligned with roller 11 and it fits within a mating cylindrical depression 33 in end cap 28, so that after roller 11 is installed over stator 17 and the forward roller mount 16 is pivoted downwardly and rearwardly, projection 32 snaps into depression 33 to rotatably support roller 11 by virtue of the bearing surfaces between projection 32 and depression 33. This roller mount may be spring biased toward depression 33 by any suitable spring, such as, for example, spring 33' mounted around pin 31.

A small semi-circular depression 34 in forward roller mount 16 serves as a finger grip for dislodging it from its position of supporting the forward end of roller 11.

The combination of stator 17 and roller 11 with its soft magnetic inner shell 27 and its restraining spring 29 act as an electromagnetic vibrator which functions as a solenoid when coil 24 is energized by an alternating current source. Alternating current energization for this purpose is supplied by means of utility power cord 35. Serially connected between power cord 35 and coil 24 by conductors in frame 12 (not shown for the sake of clarity) for on/off control is on/off switch 36.

When power is applied to coil 24 under the control of switch 36, a magnetic flux is set up in magnetic core 19 and shell 27 taking the closed path of the magnetic flux vector 37 which flows forward through member 21, diverges radially outwardly through member 23, returns rearwardly through shell 27 and converges radially inwardly through member 22 and back into member 21. It is noted that flux path 37 in passing from member 27 to member 22 at the rearward extremity of member 27 traverses a gap of non-magnetic media including an air gap and an edge of the rear roller mount 15. Forces produced by the magnetic flux traversing this gap tend to motivate the roller 11 in a rearward direction against the restraining force of spring 29. Because the utility power is an alternating current source, typically operating at 50 or 60 hertz, the force produced pulsates at a frequency twice that of the applied alternating current source so that roller 11 is thus caused to vibrate in an axial direction.

The vibrating motion of roller 11 thus produced is utilized to drive the serrated surface against the fibers of the meat to provide a vigorous tenderizing action as the operator gripping the tenderizer 10 by means of hand grip 14 moves the roller 11 over the surface of the meat. Finger guard 13 protects the fingers of the operator against accidental contact with the vibrating serrated surface of roller 11.

The meat tenderizer 10 of FIGS. 1 and 2 has a number of advantages over prior art manual and electrical hand-held appliances. First, it produces a vigorous tenderizing action while retaining a relatively high degree of mechanical stability owing to the high frequency of the vibrating action to the inertial mass of the tenderizer 10. Second, there are only two moving parts including the roller 11 and the spring 29 so that operating life and maintainability are greatly enhanced. Third, the operator can methodically apply an evenly distributed tenderizing treatment to the meat by simply moving the roller over the surface area of the meat. The inertia of the meat also works to advantage as it urges the mass of the meat to resist the rapid vibrating excursions of the serrated roller 11 and in such inertial resisting action the fibers of the meat are more effectively torn and broken apart, as desired.

Figure 3:
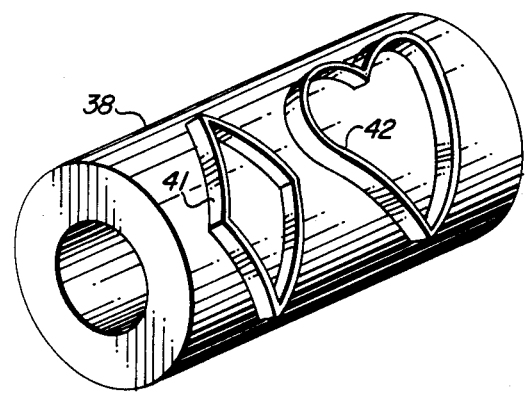
FIG. 3 is a perspective view of a roller which may be substituted for the meat tenderizing roller shown in FIGS. 1 and 2, the roller of FIG. 3 being employed for other purposes such as cutting dough for cookies.
Figure 4:
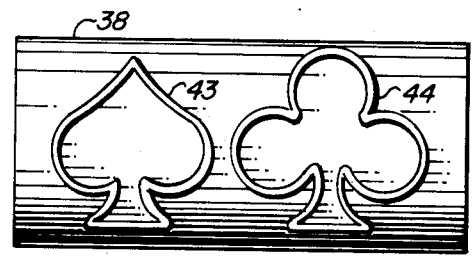
FIG. 4 shows the back side of the roller shown in FIG. 3 but incorporating a different design.

Apart from the desired features just enumerated for tenderizer 10 which were associated with the tenderizing function, an additional advantage is afforded by the provision of an interchangeable roller 38 as illustrated in FIGS. 3 and 4. Roller 38 is in the form of a long hollow cylinder having radial and axial dimensions approximately the same as those of roller 11. Instead of the serrated outer surface provided in the case of roller 11, roller 38 has a smooth cylindrical outer surface broken only by raised cookie-cutter patterns 41, 42, 43 and 44. The patterns may be closed designs of any desired configuration formed by thin erect cutting walls projecting radially and perpendicularly from the smooth cylindrical outer surface of roller 38. When roller 11 is removed from tenderizer 10 and roller 38 is installed in its place, the modified tenderizer 10 becomes a cookie cutter, or with other desired configurations on the roller 38 can dice vegetables, cut french fries or noodles, etc. With no power applied through cord 35, the operator gripping hand-grip 14 simply rolls roller 38 over the rolled-out cookie dough to quickly cut the dough into the forms of patterns 41, 42, 43 and 44. Additional patterns of a configuration may be provided on other auxiliary rollers, not shown. While in the general use of the modified tenderizer 10 as a cookie-cutter the power source is not intended to be applied; it may be found that for some consistencies of cookie dough the attendant energization of the vibrator will aid in preventing the dough from adhering to the cutters.

In a second embodiment of the invention an electrically operated hand-held meat tenderizer 46 is provided as illustrated in FIG. 5, the tenderizer 46 comprising a rear motor housing 47, a forward gear-and-cam housing 48, impactors 49 and 50 and a handle 52 which is cantilever mounted to the top of motor-and-cam housing 48 and projecting upwardly and rearwardly therefrom. Handle 52 extends the length of and parallel with motor housing 47 but sufficiently upwardly displaced therefrom to allow room between handle 52 and housing 47 for the fingers and knuckles of the operator.

Impactors 49 and 50 are of solid metal construction each in the general shape of a cube. Each has a serrated under surface 53 and is supported by a vertical shaft 54 extending upwardly from the top surface of impactor 49 or 50. Each shaft 54 extends upwardly into the gear-and-cam housing 48 through a circular hole 55 passing thereafter through a coil spring 56 which is retained by a rounded cap 57 rigidly attached to the upper extremity of shaft 54.

The rounded top surface of cap 57 is in contact with the working surface of a cam 58. Cam 58 is rotatably mounted by means of a shaft 59 having an axis of rotation which is horizontal, running front-to-rear of motor housing 47 and perpendicular to vertical shaft 54. Shaft 54 is keyed to its associated bearing 54' for longitudinal movement thereon.

The general configuration of cam 58 is cylindrical about shaft 59. A set of gear teeth 61 is cut into the rear edge of cam 58 completely encircling its cylindrical surface. The forward portion of cam 58 is cut back from the outer cylindrical surface toward the axis at a variable (as a function of angular displacement) radial distance 60 from the center of shaft 59.

Attached to the forward end of motor shaft 62 which projects horizontally forward from motor housing 47 as shown in FIG. 5 and which lies parallel to shaft 59 is a small circular gear 64 which engages gear teeth 61 of the first and second cams 58, thereby turning cams 58 about their axis of shafts 59 as an electric motor concealed within housing 47 is operated. As cams 58 are rotated, their working surfaces 63 of their forward cam sections engage the top surfaces of caps 57 thereby driving caps 57, shafts 54 and impactors 49 and 50 downwardly through a variable displacement 60 from the center of shafts 59 corresponding to the variable distances 60 of the working cam surfaces 63 from the center of shafts 59. This downward displacement produced being resisted by springs 55 which tends to raise shafts 54 and impactors 49 and 50 to their maximum height allowed by cam surfaces 63 in the instantaneous rotational positions of cams 58.

It should be recognized that impactors 49 and 50 are identically driven by identical cams 58 which are diametrically positioned relative to gear 64 and which are both engaged and driven by gear 64. Because of the diametric positioning of identical cams 58, however, the two cams 58 are driven in opposite rotational directions. Further, the two cams may be arranged to raise and lower impactors 49 and 50 simultaneously or alternatively to provide for a 180° phase relationship between the rising and falling motions of the impactors 49 and 50.

The desirability of the 180° relationship as opposed to the in-phase relationship between the motions of impactors 49 and 50 is in part dependent upon the relative magnitudes of the inertial moments of the tenderizer 46 about its axis of rotation. If the inertial moment about its horizontal forward-to-rear axis (parallel to motor shaft 59) is smaller than its inertial moment about its horizontal side-to-side axis it will then, in terms of this consideration, be more desirable to operate impactors 49 and 50 in-phase to reduce rotational vibrations about the forward-to-rear axis. The in-phase operation, however, produces greater pulsations in the loading of the drive motor and also produces a rocking vibration about the horizontal side-to-side axis. These considerations must be weighted in determining the most appropriate phase relationship in a given design.

Additional detail involving the mounting of impactor shaft 54 and its geometric relationship to cam 58 is illustrated in FIG. 6 where shaft 54 is shown to pass through a sleeve bearing 65 which is mounted in the underside of gear-and-cam housing 48. Cam housing 48 is reinforced at the point of mounting of bearing 65 by a fillet 66.

FIGS. 7 and 8 illustrate an alternate means for driving impactors 49 and 50 of tenderizer 46. As shown in FIG. 7, shaft 54 of impactor 49 again passes through a sleeve bearing 65 secured in the under side of housing 48 but in this case the upper extremity of shaft 54 is captive within a cylindrical hole 67 formed in the underside of the top wall of housing 48. Shaft 54 is thus more securely held and prevented from rocking side-to-side within sleeve bearing 65 than in the case of the arrangement of FIG. 5 while it is still free to move up and down within bearing 65 and hole 67.

A different coupling means between shaft 54 and the drive motor is also employed in the arrangement of FIGS. 7 and 8. Instead of the cam 58 of FIGS. 5 and 6, the arrangement of FIGS. 7 and 8 employs a gear-and-pin wheel 68. Wheel 68 is axially mounted on shaft 59 which corresponds directly to shaft 59 of FIG. 5, and it again has a set of gear teeth 69 encircling its rear portion corresponding directly to teeth 61 of FIG. 5, the gear teeth 69 being driven also in this case by gear 64 of FIG. 5. The front portion of wheel 68, however, is in the form of a wheel having a flat circular forward surface 71 which has a small pin 72 mounted near the edge and projecting perpendicularly forwardly therefrom. As wheel 68 rotates about shaft 59, pin 72 thus follows a circular path about the axis of rotation of shaft 59. A connecting link 73 is pivotally connected at one end to pin 72 and at the opposite end to pin 74 which projects horizontally rearwardly from clamp 75 which encircles shaft 54 of impactor 49 and which is secured rigidly thereto by means of a set-screw 76. As wheel 68 rotates, the upper end of link 73 follows the circular path of pin 72 while the opposite end of link 73 moves up and down in a vertical path being constrained from lateral motion by virtue of its coupling to shaft 54. Link 73 thus functions as a rocker arm transferring only the vertical component of the circular motion of pin 72 to shaft 54.

As shown in FIG. 8, identical wheels 68 are coupled by means of identical connecting links 73 to shafts 54 of impactors 49 and 50. The identical wheels 68 are again coupled to gear 64 and are diametrically positioned relative to gear 64, and the considerations governing the desirability of in-phase or 180° out-of-phase operation of impactors 49 and 50 again apply. As shown in FIG. 8, the wheels 68 are oriented to produce the 180 degree out-of-phase operation.

For the tenderizer 46 in either the variations of FIGS. 5 and 6 or 7 and 8 the drive motor concealed in housing 47 may be either an alternating-current motor energized from the 50 or 60 hertz utility line or it may be a direct current motor driven from a set of rechargeable batteries also concealed within housing 47.

For either of these arrangements variable speed settings may be selected by means of control switch 77 which is mounted on the forward top surface of handle 52. Control switch 77 also has an off position to totally disconnect power from the drive motor.

The novel and inexpensive coupling means between drive motor and impactors just described represent a significant advancement over the prior art.

Also, by virtue of the location of bearing 65 on the under surface of housing 48 and with shaft 54 extending upwardly through bearing 65, liquid foreign matter is substantially prevented from entering housing 48. In comparable prior art appliances it was possible for liquids to collect around a corresponding shaft and to flow downwardly along the shaft into the internal mechanism.

Although but a few embodiments of the present invention have been illustrated and described, it will be apparent to those skilled in the art that various modifications may be made thereto without departing from the spirit of the invention or from the scope of the appended claims.

What is claimed is:

1. A hand-held electric appliance for producing reciprocating motion of a work head comprising in combination:
a frame defining a handle for holding the appliance by one hand of the user,
a reciprocating work head mounted on said frame,
said work head comprising a sleeve rotatably mounted on said frame,
drive means mounted on said frame for reciprocating said work head,
spring means mounted on said frame for biasing said head against the reciprocating action of said drive means,
said drive means being intermittently connected to said work head and comprising a vibrator,
and means for connecting said vibrator to a source of alternating current,
said vibrator reciprocating said work head longitudinally of the axis of said sleeve,
said frame comprising a pair of spaced bearing means for rotatably mounting the opposite ends of said sleeve,
one of said pair of bearing means being hingedly mounted for pivotal movement to permit the insertion and removal of said sleeve from between said bearing means,
said sleeve being rotated manually by the user moving the appliance along a surface while said sleeve is vibrated longitudinally of its longitudinal axis.

2. The hand-held electric appliance set forth in claim 1 wherein:
said sleeve is inserted over said vibrator when it is mounted on said frame.

3. The hand-held electric appliance set forth in claim 1 in further combination with:
an on/off switch mounted on said handle for connecting and disconnecting said drive means to a source of electric current.

4. The hand-held electric appliance set forth in claim 1 wherein:
the outer surface of said sleeve is provided with serrations.

5. The hand-held electric appliance set forth in claim 1 wherein:
the outer surface of said sleeve is provided with a cutter configuration.

* * * * *